May 23, 1944.   J. W. BUTLER   2,349,611
PROTECTION OF POLYPHASE IMPEDANCE NETWORKS
Filed Nov. 23, 1942
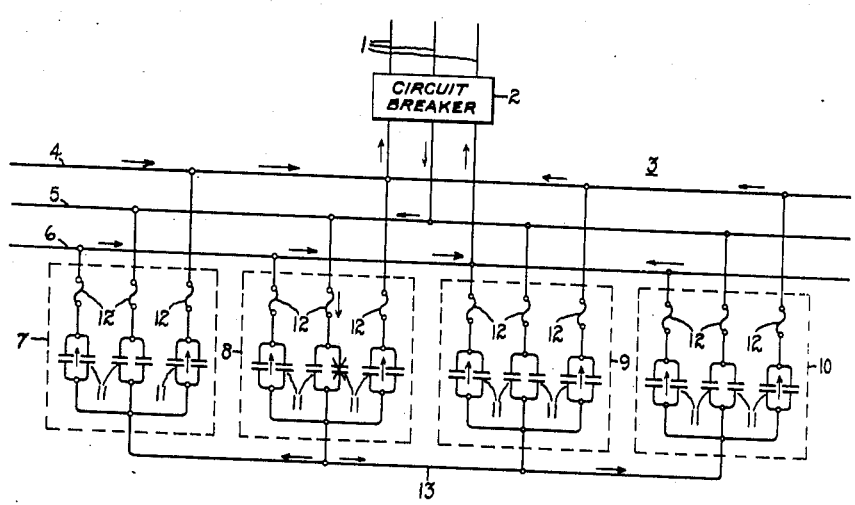
Inventor:
John W. Butler,
by Harry E. Dunham
His Attorney.

Patented May 23, 1944

2,349,611

UNITED STATES PATENT OFFICE 2,349,611

PROTECTION OF POLYPHASE IMPEDANCE NETWORKS

John W. Butler, Schenectady, N. Y., assignor to General Electric Company, a corporation of New York Application November 23, 1942, Serial No. 466,606

3 Claims. (Cl. 175—294)

This invention relates to electric circuits and more particularly to the automatic protection of polyphase impedance networks.

Impedance elements, such as reactors and capacitors, are often connected across polyphase alternating-current power circuits in either mesh- or star-connected banks. In the case of star-connected banks the neutral may be either grounded or ungrounded. In the case of capacitors it is especially important to provide automatic protection in case of failure of a capacitor unit. Such units are usually made in standard sizes and the necessary amount of volt-amperes of capacitive reactance is obtained by suitable series-parallel connections of these standard units. However, regardless of the connections, the failure of a capacitor usually means the breakdown of its dielectric and consequently a short circuit is produced across its terminals, so that regardless of how many sound units are in parallel with it the entire parallel group is, in effect, short circuited by the failure of one unit. Furthermore, even though the total current does not increase much as a result of failure of one unit the current through the failed unit will increase by at least as many times as there are parallel-connected units and this usually relatively large increase in current causes arcing and heating in the capacitor which when it is of the type which has a liquid dielectric causes the rapid building up of pressure and the not infrequent explosion of the unit.

A convenient way of protecting such circuits against failure of a unit, and the results of failure, is by means of fuses. However, in the case of large installations it becomes relatively expensive to provide a separate fuse for each capacitor unit. Group fusing, that is to say, the use of a single fuse for a number of series, or parallel, or series-parallel units, has been employed. However, when the group which is protected by a fuse is connected solidly across one of the phases of the power circuit the fuse must be able to interrupt the relatively large number of volt-amperes which the system or circuit can deliver to the fault and it has been found that in large systems fuses are incapable of reliably interrupting such large amounts of power. On the other hand, if the groups of capacitors are connected to form an ungrounded neutral star-connected bank the maximum increase in current through the fuse which is in circuit with the group in which a capacitor unit fails cannot be more than three times normal current. Experience, however, has shown that such threefold increase is not sufficient for reliable protection for a number of reasons. One reason is that the fuse must ordinarily be able to stand a current substantially greater than normal current so as not to be melted by the inrush current of the capacitors and so as not to be melted by harmonic currents and momentary overvoltages. Another reason is that even if the fuse can be made so that it will not melt under normal switching or voltage surge conditions but will melt under the threefold increase condition, nevertheless its time of melting will be so long that there will be danger of explosion of the short-circuited capacitor unit. With present fuses and capacitors it is believed that the minimum safe increase in fuse current should be about ten times normal.

In accordance with the present invention there is provided a new and improved circuit arrangement which will give any desired increase in fuse current when an impedance unit fails. The invention is characterized by a plurality of star-connected banks of impedance elements which are connected in parallel with each other and whose neutrals are ungrounded and are solidly tied together. In this manner when a unit in one phase of one bank fails all of the units in the other phases of all of the banks are in effect in parallel with each other with respect to the fault current so that the impedance to the fault current may be reduced to almost any desired extent.

An object of the invention is to provide a new and improved arrangement for fusing impedance elements.

Another object of the invention is to provide an arrangement for improving the fusing of capacitor banks.

The invention will be better understood from the following description taken in connection with the accompanying drawing and its scope will be pointed out in the appended claims.

Referring now to the single figure of the accompanying drawing wherein there is illustrated diagrammatically an embodiment of the invention, the illustrated circuit comprises, by way of example, a three-phase circuit 1 which is connected through a circuit breaker 2 to a three-phase bus 3 comprising conductors 4, 5 and 6. Across this bus in parallel are connected four Y-connected capacitor banks 7, 8, 9 and 10. Each phase of each bank comprises, by way of example, a group of two parallel-connected capacitors 11 connected in series with a fuse 12. The neutrals of all of the banks are directly interconnected by a conductor 13 which is insulated from ground.

The operation of the illustrated embodiment of the invention is as follows: Assume that circuit breaker 2 is closed and that normal voltage is impressed across all of the capacitor units and that consequently normal current flows in each one. Assume now that any one of the capacitors fails such, for example, as the right-hand capacitor of the group connected to phase conductor 5 in bank 8. The fault in this capacitor is indicated by an X. Because of the fact that two capacitors are connected in parallel, the current through the short-circuited capacitor will immediately at least double even though the current through the fuse 12 in series with it should not increase at all. If capacitor banks 7, 9 and 10 were not present the current through the fuse 12 in series with the short-circuited capacitor would increase to three times normal because of the fact that the remaining two sound groups of capacitors are now connected across two of the line-to-line voltages of the system through the short-circuited capacitor and its fuse. As the line-to-line voltage is equal to the $\sqrt{3}$ times the line-to-neutral voltage and as the vector sum of their corresponding currents is equal to the $\sqrt{3}$ times one of them, it follows that the fuse current is equal to the $\sqrt{3}$ times $\sqrt{3}$ times the normal current or three times the normal current. However, the other capacitor banks 7, 8 and 9 provide parallel paths for the currents produced by the line-to-line voltages so that in the case of the four parallel banks shown the current through the fuse which is in series with the faulted capacitor becomes four times as much as it would be with only one bank and it therefore increases to twelve times the normal current.

The fault current flow is indicated in the drawing by arrows which show that this current flows through the faulted capacitor and its fuse and also through all of the other capacitors which are connected to the other two phases of the system, that is to say, to the phases of the system with which the faulted capacitor is not directly connected.

The invention is independent of the physical spacing or grouping of the capacitor units so that, for example, the banks 7 and 8 may be grouped together so as to produce a large bank and the banks 9 and 10 may be grouped together so as to produce a second large bank.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a three-phase alternating-current power circuit, at least four similar star-connected capacitor banks connected in parallel with each other across said circuit, similar fuses connected respectively in all the phases of all said banks, and means which is insulated from ground for making a solid interconnection between the neutrals of said banks whereby capacitor dielectric failure resulting in the short circuiting of one phase of one bank will cause at least a twelvefold increase in the current in the fuse in that phase of that bank.

2. In combination, a three-phase alternating-current circuit, a plurality of star-connected impedance networks connected in parallel with each other across said circuit, fuses connected respectively in all the phases of all said networks, and means which is insulated from ground for solidly interconnecting the neutrals of said networks, whereby a short circuit in any phase of any network will increase the current in its fuse to 3N times normal where N is the number of parallel networks, said fuses being constructed so as to be melted by current which is greater than 3 times normal and less than 3N times normal.

3. In combination, a polyphase alternating-current circuit, a plurality of star-connected impedance networks connected in parallel with each other across said circuit, the neutrals of said networks being solidly interconnected and insulated from ground, each phase of each network comprising a plurality of impedance units connected in parallel, said units having identical ratings, and a separate fuse connected in each phase of each network, said fuses having identical ratings which are such that they require a current flow of substantially more than three times normal in order to melt quickly enough to provide adequate protection when an impedance unit becomes short circuited.

JOHN W. BUTLER.